INVENTORS
TOSHIMICHI KII
MOTOSHI SUKA

BY Christen, Sabol & O'Brien
ATTORNEYS

United States Patent Office 3,679,651
Patented July 25, 1972

3,679,651
METHOD OF POLYMERIZING STYRENE
Toshimichi Kii, Tokyo, and Motoshi Suka, Yokohama, Japan, assignors to Mitsui Toatsu Chemicals Incorporated, Tokyo, Japan
Filed Aug. 29, 1968, Ser. No. 756,270
Int. Cl. C08f 1/04, 1/06, 7/04
U.S. Cl. 260—93.5 S         3 Claims

ABSTRACT OF THE DISCLOSURE

Process for treating viscous fluids, such as are obtained during the polymerization of monomers, e.g., styrene, comprising, continuously feeding the fluid to and agitating the fluid in a mixing and reaction zone wherein it is caused to flow in reverse directions at high flow rates and into contact with heat exchange surfaces whereby the polymerizing mixture is simultaneously and perfectly mixed while a large amount of sensible heat is absorbed, subjecting the fluid to one or more stages wherein it is continuously moved through a tubular heat exchange zone, then through an annular heat exchange zone containing, in addition, heat exchange tubes, accompanied by recirculating at high flow rates of the fluid from one zone to the other while contacting it with heat exchange surfaces and while maintaining as small a temperature differential between the heat exchange surfaces and the fluid as provides the desired heat exchange.

---

This invention relates generally to methods for treating viscous materials and, more particularly, to the heating, cooling and/or mixing of viscous materials.

In an important embodiment, this invention relates to a process for continuous bulk polymerization or continuous solution polymerization, for example, the free radical polymerization of styrene alone or with a monomer copolymerizable with it. Other polymerizable materials such as the polymerizable olefins and vinyl compounds including butadiene, acrylonitrile, acrylates, methacrylates, ethylene, alpha-methylstyrene, and suitable copolymerizable mixtures thereof can be polymerized according to this invention. While the subsequent description relates to polystyrene and copolymers of styrene, the present invention is applicable to a broad range of material treatments.

It is extremely difficult to economically produce on an industrial scale a transparent polymer which is high in such physical properties as tensile strength and which has a narrow molecular weight distribution by the continuous free radical-polymerization of styrene alone or with a monomer copolymerizable with it while maintaining a uniform polymerization temperature.

In styrene homopolymers and copolymers, generally, the narrower the range of the molecular weight distribution, the better the physical properties of the product. In injection molding such polymers, or copolymers, when the minimum injection pressure is comparatively low, the tensile strength of the molded polymer is high. However, in the continuous bulk polymerization and continuous solution polymerization by free radical polymerization, there is a specific relationship between the polymerization temperature and the molecular weight distribution of the produced polymer. Thus, if the polymerization is conducted at a specific uniform temperature, the molecular weight distribution of the produced polymer can be narrowed and the physical properties such as the tensile strength can be considerably improved. However, in the case of polymerizing styrene, alone or with a comonomer, a large quantity of reaction heat is generated. For example, in polymerizing a styrene monomer at 120° C., there is a heat generation of about 169 kcal./kg. Thus, if the polymerization is completely conducted adiabatically starting at 120° C., such a large quantity of reaction heat is generated as to cause a temperature rise of about 300° C. and higher and as the polymerization progresses, the viscosity of the reaction mixture rises quickly. Even if the temperature of the reaction mixture is reduced or is maintained at a lower level by cooling or the like, the viscosity of the reaction solution still rises.

Furthermore, when the polymerization apparatus is enlarged to increase the treating capacity to the industrial level, the polymerization heat increases in proportion to the increase of treating capacity. However, it is essentially difficult in the structure and design of the polymerization apparatus to increase the cooling heat transfer area in proportion to increase of the polymerization heat. Therefore, it was generally believed that the temperature difference between the temperature of the polymerizing mixture and the temperature of the cooling medium had to be large.

In line with this belief, the temperature of the cooling medium was made low, as low as possible. However, when this was done, the temperature of the polymerization mixture adjacent to the cooling heat transfer surface was considerably lowered and as a result the viscosity of such adjacent polymerization mixture became locally remarkably high. As a result, the fluidity of the polymerizing mixture adjacent to the cooling heat transfer surface was lowered and, consequently, the transmission of the reaction heat to the cooling heat transfer surface was obstructed. Thus, the cooling effect of removing the polymerization heat of the system does not rise in proportion to the widening of the temperature difference by reducing the temperature of the cooling medium. The temperature of the polymerizing mixture in the polymerization reactor becomes non-uniform as a whole, resulting in the expansion of the molecular weight distribution of the resulting polymerized product. In addition, that part of the polymerization mixture adjacent to the cooling heat transfer surface is so much lower in temperature, so much higher in viscosity and so much lower in fluidity than the remaining parts not adjacent to the cooling surface that a stagnated layer is formed.

Therefore, it is inevitable that the molecular weight distribution of the polymerized product obtained by such a polymerization is widened and the physical properties deteriorate as described above. Furthermore, in such prior process, the portions of polymerizing mixture adjacent the cooling surface forms a stagnated layer, thus substantially reducing the effective reaction capacity of the reactor and the productivity per geometrical capacity.

There is also suggested a process, wherein, as in U.S. Pat. No. 3,206,287, the cooling heat transfer coefficient is intended to be improved by intermittently scraping off the greater part of the viscous layer of polymerizing mixture adjacent the cooling surface with a scraper. However, in such a process, first, it is necessary to leave sufficient annular space to permit the rotation of the scraper itself and/or the rotation of the arm for holding and driving the scraper. Thus, the polymerization reactor must be made larger and it becomes necessary to increase the cooling heat transfer area to accommodate the increased capacity and provision must be made to scrape the increased area also. If several annular cooling surfaces are provided, a space must be provided for the free rotation of the scraper and arm and the apparatus becomes complicated in vain and more expensive.

Second, a very large driving force is required to rotate the arm holding the scraper in the viscous polymerizing mixture and to scrape off the more viscous layer in contact with the cooling surface. Since this driving force is applied from outside the reactor it is all converted to heat energy which is imparted to the polymerization system in the reactor and this additional heat input must also be removed through the cooling heat transfer surface in addition to the heat of polymerization. Therefore, even if the apparent heat transfer coefficient is improved by scraping the cooling heat transfer surface with the scraper, due to the heat input the overall improvement of the cooling heat transfer capacity for the polymerizing reaction heat is slight.

For the two reasons mentioned above and because of the high viscosity of the polymerizing mixture, it is difficult, even by the above-mentioned scraping process, to eliminate the temperature gradient in the general polymerizing mixture and to eliminate the above-mentioned stagnated layer which is low in temperature and high in viscosity. Further, what is also important is that, in the process of scraping the cooling heat transfer surface the fine powder formed by frictional wear of both the scraper and the heat transfer surface mix into the polymerizing reaction solution to degrade the transparency of the polymerization product.

There has been also suggested a process wherein a continuous bulk polymerization is conducted with a reaction column having many cooling pipes and slowly rotating blades as disclosed in U.S. Pat. No. 2,727,884. However, in this prior process, the mixing, as the polymerizing mixture flows down from above, is so insufficient that, in the initial stage of the reaction in the upper part of the column where the concentration of the monomer reacting to polymerize at a substantially high reaction velocity is high, the reaction heat cannot be absorbed by the sensible heat of the raw material monomer. Therefore, it is evident also from the examples in the above-mentioned patent that, in the initial stage of the reaction in the reaction column, the polymerizing reaction must be conducted at a comparatively low reaction temperature. Thus, there is a considerable temperature gradient in the column resulting in the disadvantage that the molecular weight distribution of the polymerization product is thereby broadened.

The present invention provides a process which is well suited for the continuous bulk polymerization and/or continuous solution polymerization by free radical reaction. The above-mentioned disadvantage at the time of the polymerization is eliminated. The polymerization is conducted at a temperature as uniform as possible throughout the entire polymerizing period under conditions wherein the viscosity of the polymerizing mixture becomes high with the lapse of time as the polymerization proceeds. The molecular weight distribution of the obtained polymer is narrowed and, as a result, as described above, desirable physical properties such as high tensile strength of injection moldings even at low minimum injection pressures are obtained. The capacity of the polymerizing reactor to produce a perfectly transparent polymer is high.

The process of the present invention can be applied to the continuous bulk polymerization and solution polymerization by free radical polymerization of styrene alone or with a monomer copolymerizable therewith. Therefore, the process can be used to continuously bulk polymerize or solution polymerize styrene, for example, to produce polystyrene and such styrene copolymers as styrene-methyl methacrylate copolymers or styrene-acrylonitrile copolymers. As pointed out above the process can be used to polymerize other olefinically unsaturated monomers.

The details of one embodiment of the present invention are explained with reference to the following drawings.

Figure 4:
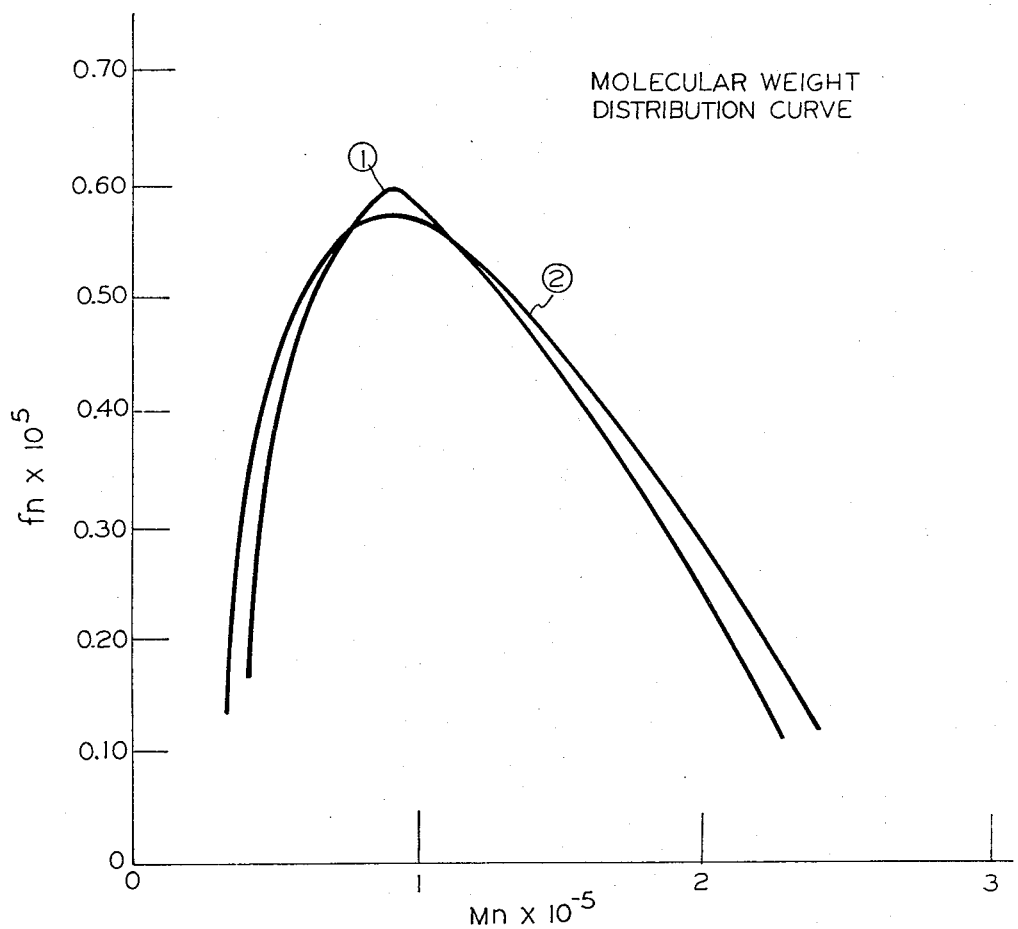

FIG. 4 is a graphic representation of the molecular weight distribution of a styrene polymer produced in accordance with the present invention and the molecular weight distribution of a styrene polymer produced by a similar polymerization process but with the last stage substituted with apparatus disclosed in U.S. Pat. No. 3,206,287.

Figure 1:
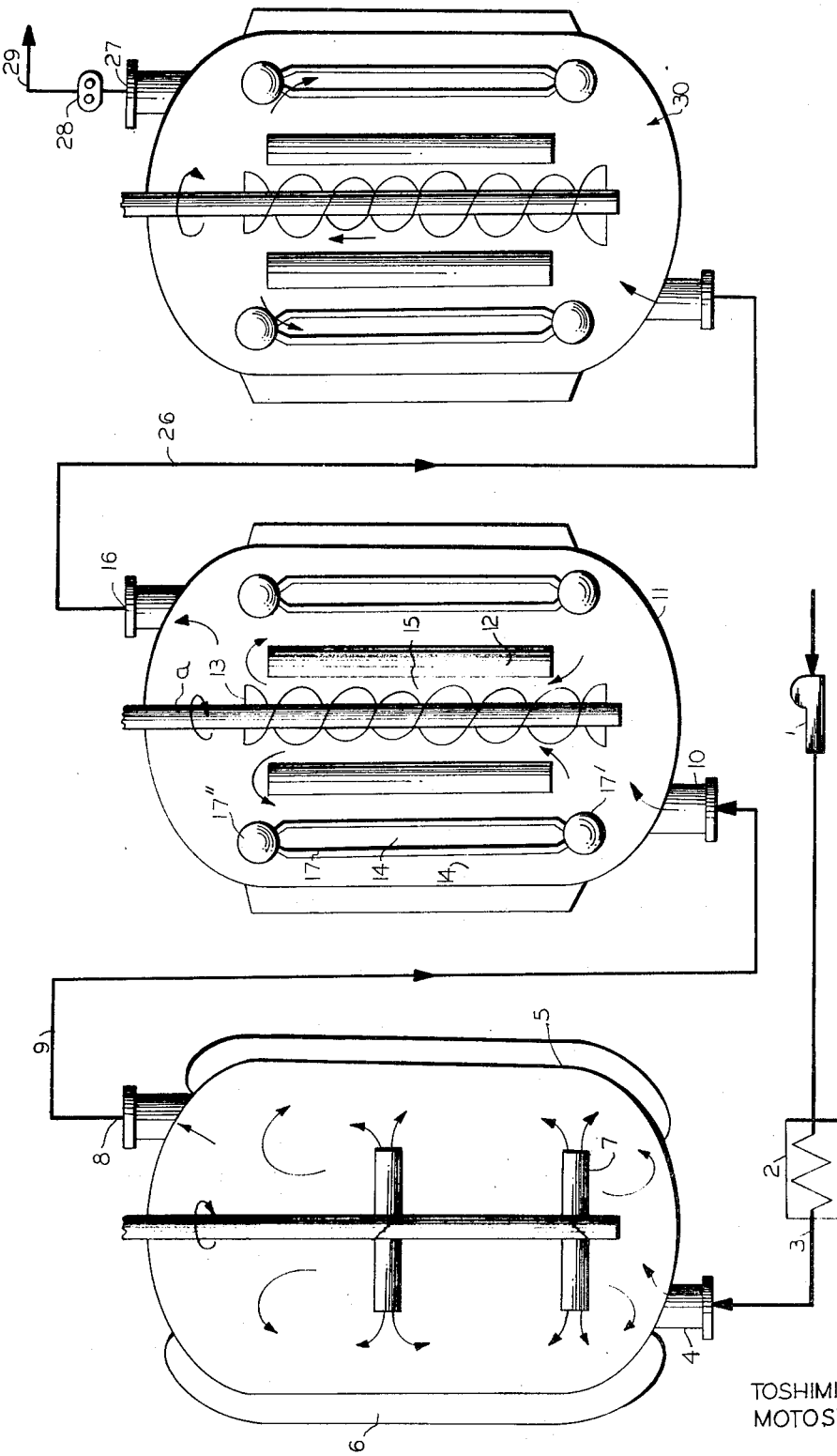
FIG. 1 is a schematic diagram of a system and apparatus for use in polymerizing monomers according to the present invention.

The invention is explained first with reference to FIG. 1. A raw material, for example, a monomer to be polymerized, such as, styrene alone or mixed with a monomer copolymerizable with it, a known solvent to be used for the polymerization and any other additive required or desired for the polymerization as properly blended according to the kind of polymerization product desired, is fed into a first stage reactor 5 through an inlet 4 through a heat exchanger 2 and a conduit pipe 3 by an ordinary metering pump 1.

The first stage reactor 5 has an agitator 7 having vanes of an ordinary turbine type in two steps. By properly selecting the dimensions and rotating velocity of these agitating vanes and adding the later described means, a reaction is conducted quickly at a fixed constant polymerizing reaction temperature so that the polymerizing reaction solution in the first stage reactor 5 may obtain a desired average molecular weight while maintaining a substantially uniform substantially perfectly mixed state. Since the raw material to be fed into the first stage reactor 5 is usually high in monomer concentration, the polymerization velocity in the first stage reactor 5 is high and therefore the generation of the polymerization heat therein is the largest. Therefore, with indirect cooling with an ordinary cooling medium, it is difficult to carry on the polymerization at a specific constant polymerization temperature without causing the above-described various disadvantages due to large temperature gradients.

In order that the raw material having first entered the first stage reactor 5 through the inlet 4 may substantially instantaneously and substantially perfectly mix with the polymerizing mixture in the first stage reactor 5 so as to maintain a uniform temperature state, the agitating vanes 7 are provided in a plurality steps (two are shown) and are twisted so that the flows delivered from the respective agitating vanes may be directed vertically reverse to each other as shown by the arrows in FIG. 1 and the number of revolutions of the agitating vanes 7 is so set that the ratio, $Oy/F$, of the total (represented by $Qv$) of the flow volumes delivered from the amount (represented by F) of the raw material entering the first stage reactor 5 is about 500 to about 1000:1 on a volume basis. Then, there is the indirect precooling of the raw material fed in through inlet 4 to a proper temperature with the heat exchanger 2 utilizing a suitable cooling medium. The moment the raw material properly precooled by the heat exchanger 2 enters the first stage reactor 5 through the inlet 4, it substantially instantaneously and perfectly mixes with the polymerizing mixture at the desired specific polymerization temperature. In such case, as the temperature of the raw material at the inlet 4 rises substantially instantaneously up to the polymerization temperature in the first stage reactor 5, a large amount of sensible heat is absorbed. If the temperature of the raw material coming in through the inlet 4 is properly selected as described above, this sensible heat will be sufficient to absorb substantially all the polymerization heat given off in the first stage reactor 5.

The first stage reactor 5 has on the side wall a jacket 6 through which a cooling medium is circulated for adjusting the polymerization temperature indirectly. Since the cooling medium flowing through the jacket 6 has only the object of the fine adjustment of the polymerization temperature, the temperature of the cooling medium need not be so different from the temperature of the polymerizing mixture. Thus, due also to the above described substantially perfectly mixed state of the polymerizing mixture, there is substantially no temperature gradient in the first stage reactor 5 and the average molecular weight range of the produced polymer is narrow. By this means, the specific and uniform polymerization temperature is very easily maintained and accordingly the above described various disadvantages resulting from a large temperature gradient are eliminated.

In a specific operation, a mixed solution of styrene alone or with a monomer copolymerizable therewith and a solvent with or without the addition of a known polymerization catalyst is fed into the first stage reactor 5 through the inlet 4 after being passed through the heat exchanger 2 by the metering pump 1 as described above. In reactor 5 the temperature of the solution is elevated to the polymerizing temperature and is at the same time maintained at a fixed polymerizing temperature while rotating the agitator 7 in the reactor 5. At the same time, the mixed solution to be fed into the reactor 5 is indirectly cooled to 0 to 45° C. by flowing a cooling medium through the heat exchanger 2 and then is fed into the reactor 5 and, together with the cooling medium being flowed through the jacket 6 in the reactor 7, it keeps the polymerizing temperature of the polymerizing reaction solution in the reactor uniformly at the fixed temperature.

With the progress of the polymerizing reaction, the viscosity of the polymerizing reaction solution increases. When it becomes more than about 40 poises, it becomes substantially impossible to keep uniform the polymerizing temperature throughout the system in the reactor 5. Therefore, while the viscosity of the polymerizing reaction solution in the first stage reactor 5 is still less than about 40 poises, an amount of the polymerizing reaction solution equal to the amount of solution being fed into the reactor 5 is fed through an outlet 8, a heat-insulated conduit pipe 9, into a second stage reactor 11 through inlet 10.

It is preferable that the viscosity of the polymerizing reaction solution coming out of the first stage reactor 5 be as close to about 40 poises as possible. That is to say, in the first stage reactor 5, since the polymerization is in the initial stages, the monomer concentration is comparatively high and the reaction is quick. Therefore, it is preferable, from the viewpoint of mass-production, to permit the viscosity to reach as close to about 40 poises as possible without exceeding it for such reasons as are mentioned above.

In the second stage reactor 11, too, it is necessary to conduct the polymerization with little or no temperature gradient and as uniform as possible to give a fixed average molecular weight which is narrow in the molecular weight distribution, that is, at a temperature equal to the polymerization temperature in the first stage reactor 5. Therefore, in the second stage reactor 11, it is not possible to make such thermal balance as the relation between the polymerizing reaction in the first stage reactor 5 and the raw material being fed into it. In addition, for the inlet solution to be fed into the second stage reactor, the sensible heat based on the difference between the temperature of the inlet solution and the temperature of the reaction solution in reactor 11 cannot be used to cool the polymerization heat in reactor 11, because the polymerizing reaction solution having come out of the first polymerizing reactor 5 is already so considerably viscous (close to about 40 poises) that the coefficient of the boundary film heat transmission from the wall of the conduit pipe 9 is low and no sufficient precooling can be accomplished in the conduit pipe 9.

If a multitubular type heat exchanger is connected to pipe 9 to increase the cooling heat transfer area, with the increase of the cooling heat transfer area, generally the total of the cross-sectional areas in the cooling pipes (that is, the flow area of the polymerizing reaction solution) increases and the flow velocity of the polymerizing reaction solution drops. The boundary film heat transfer coefficient drops and the thickness of the polymerizing reaction solution in the stagnant layer (boundary film) in contact with the cooling surface increases. As a result, the cooling effect does not substantially increase and also the physical properties of the produced polymer suffers.

Therefore, in the second stage reactor 11, all of the reaction heat generated by conducting the polymerizing reaction in the reactor and the heat generated by agitation must be cooled by heat transmission through a cooling surface. Furthermore, since the polymerization has proceeded and the polymer concentration has increased, the polymerizing reaction solution in the reactor 11 is considerably viscous and generally the total heat transfer coefficient U as regards a cooling surface is low. In the present invention, as this problem is explained in detail in the following, a comparatively large cooling heat transfer surface is arranged so that the circulating flow of the polymerizing reaction solution in the reactor 11 is not obstructed and at the same time the polymerizing reaction solution is made to quickly circulate and flow with comparatively small power so that a large total heat transfer coefficient U may be obtained and thereby the various disadvantages of the conventional process may be eliminated.

Figure 2:
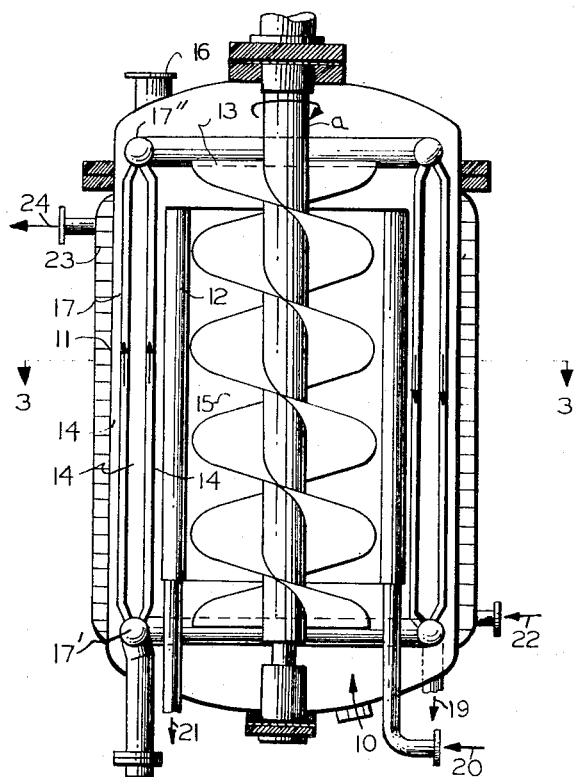
FIG. 2 is a vertical sectional view of a polymerizing apparatus for use in the present invention.

Now, the polymerizing reaction solution having come from the first stage reactor 5 and having entered the second stage polymerizing reactor 11 through the inlet 10 is pushed up through a cylindrical path 15 through a draft tube 12 by pumping action produced by a rotating screw 13 within the fixed draft tube 12 (the part forming the space between the screw 13 and the draft tube 12 is called a screw pump hereinafter). The incoming polymerizing reaction solution is first mixed with polymerizing reaction solution which has been pushed down through an annular flow path 14 between the draft tube 12 and the reactor barrel 11 as best shown in FIG. 2. A part of the polymerizing reaction solution pushed up to the uppermost part of the reactor is pushed out of the reactor through an outlet 16 but the greater part of it is pushed down through the annular flow path 14 by the upward pressure generated by the screw pump and returns to the inlet section at the lower end of the cylindrical path 15 formed by the draft tube 12.

Figure 3:
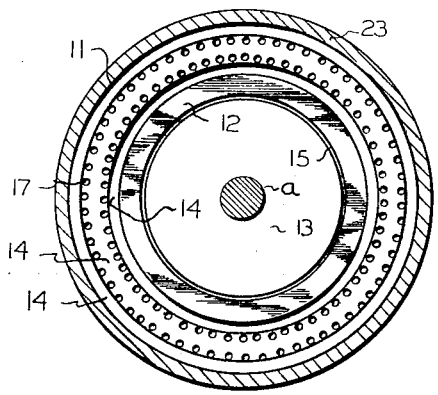
FIG. 3 is a sectional view taken along line 3—3 of FIG. 2.

The polymerizing reaction solution in the second stage reactor 11 having thus come in through the inlet 10 proceeds in the polymerizing reaction and generates polymerizing reaction heat while circulating along the paths 15 and 14 in the second stage reactor. In the annular flow path 14, as best shown in FIG. 3, are vertically arranged many cooling pipes 17 for indirectly cooling said polymerizing solution. The cooling medium comes in through an inlet 18, passes through a lower header 17' of the cooling pipes into the cooling pipes 17, thence through an upper header 17" of the cooling pipes and comes out of the reactor through an outlet 19. Further, cooling medium is circulated through an inlet 20, flows internally through the draft tube 12 which is hollow, and comes out of the reactor through an outlet 21. Still further cooling medium is circulated through the inlet 22, flows spirally through a jacket 23 covering the barrel 11 of the reactor and comes out through the outlet 24.

Such cooling media absorb the polymerization heat generated by the polymerizing reaction solution in reactor 11, perform the role of making the temperature of the polymerizing reaction solution, equal to the polymerizing reaction temperature of the first stage reactor 5, and are taken out of the reactor as mentioned above.

It has been found that, when the ratio, $Qs/F$, of the total of the amount ($Qs$) of the polymerizing reaction solution pushed down through the annular flow path 14 to the amount of the polymerizing reaction solution fed in through the inlet 10, that is, the amount of the polymerizing reaction solution pushed up by the screw 13 (which is called a screw delivery quantity Qs hereinafter) to the amount, F, of the polymerizing reaction solution coming in through the inlet 10 (which is substantially equal to the amount of the polymerizing reaction solution exiting through the outlet 16 as described later and is called the polymerizing reaction treating quantity) is made more than about 35:1, the polymerizing reaction solution in the reactor is in a substantially perfectly mixed state, that is, in a substantially uniform state throughout, and it is immaterial that some of the polymerizing solution coming in through inlet 10 may have passed only once through the cylindrical path 15 when it is exited through the outlet 16.

By the arrangement in reactor 11 as explained above, the viscous polymerizing reaction solution can be made to flow and circulate at a sufficient velocity along the entire cooling surface with slight power requirements. In addition, a substantially perfectly mixed state and a sufficient $A \times U$ value are obtained and thereby a substantially uniform polymerizing reaction temperature is attained.

The above-mentioned sufficient circulating flow velocity varies depending on the kind of monomer being polymerized, the kind of solvent, the amount of solvent, the size of the reactor and the inlet and outlet feed rates of the reactor. However, it has been found to be generally suitable to maintain the weight ratio of the screw delivery quantity to the polymerizing reaction treating quantity in the approximate range of 50 to 150:1.

The polymerizing reaction solution polymerizes uniformly in the second stage reactor at the polymerization temperature selected for obtaining the desired average molecular weight and a flow volume equal to the amount coming in through the inlet 10 flows out through the outlet 16 into the third stage reactor 30 through the heat-insulated conduit pipe 26.

The structures of the polymerizing reactors in and after the third stage, if any, are the same as the structure of the second stage reactor. The polymerizing process in subsequent stages is substantially the same and therefore their explanation is omitted. Any number of reactors may be used; however, the total number of reactors is optimum at 3 to 5.

Further, as shown in FIG. 1, a gear pump 28 having a downwardly directed suction port and an upwardly directed delivery port is set above a short heat-insulated outlet pipe 27 connected to the upper part of the final stage reactor. Amounts of polymerizing reaction product, equal to the amounts F of the raw material fed in by the raw material metering pump 1, can be thereby taken out and the flow volume in the entire polymerizing reaction step in each polymerizing reactor thus can be regulated.

By regulating the flow volume of the polymerization product with the gear pump 28, the amount of the polymerizing reaction solution coming out through the outlet 8 of the first stage reactor 5 and the amount of the polymerizing reaction solution coming out through the outlet 16 of the second stage reactor 11 can be regulated to be respectively equal to the amounts of the raw material and the polymerizing reaction solution entering the first stage reactor 5 through the inlet 4 and entering the second stage reactor 11 through the inlet 10. Thus, the polymerization can be conducted at the highest volumetric efficiency with each reactor in a filled state.

Thus, the objective polymerization product of the present invention is taken out through the conduit pipe 29 connected to the outlet of the gear pump 28 and is suitably treated to remove volatiles.

Typical feed rates, F, would fall into the range of about 19 to about 190 cubic feet per hour or about 490 to about 4900 kg./hr. Typical temperatures of the contents of the reactors would be about 180° C. to about 80° C.

Now the superiority of the polymerizing process and apparatus according to an embodiment of the present invention is explained with reference to the following examples.

EXAMPLE 1

The following table shows data on productions of general purpose polystyrene from styrene monomer on an industrial scale.

These productions are of two cases (A) where the polymerization was carried out by using respective polymerizing reactors in the order of I→II→III→IV as designated in Table I below and (B) where the polymerization was carried out by using respective polymerizing reactors in the order of I→II→III→V as designated in Table I. The scraping type reactor V was of the structure shown in FIGS. 1 and 2 of U.S. Pat. No. 3,206,287.

TABLE I

| | I | II | III | IV | V |
|---|---|---|---|---|---|
| | First stage reactor 5 | Second stage reactor 11 | Third stage reactor 30 | Fourth stage reactor (same as 11 and 30) | Scraping type reactor of USP 3,206,287 |
| Feed rate for each reactor: | | | | | |
| Styrene monomer, kg./hr. | 1,113.4 | 622.0 | 334.1 | 246.4 | 246.4 |
| Styrene polymer, kg./hr. | | 491.4 | 779.3 | 867.0 | 867.0 |
| Toluene (solvent), kg./hr. | 166.4 | 166.4 | 166.4 | 166.4 | 166.4 |
| Total kg./hr. | 1,279.8 | 1,279.8 | 1,279.8 | 1,279.8 | 1,279.8 |
| Inlet temperature, °C. | 10 | 138 | 138 | 138 | 138 |
| Conversion at outlet, wt. percent | 44.1 | 59.1 | 70.0 | 77.9 | 74.4 |
| Increase in conversion between inlet and outlet of reactor | 44.1 | 15.0 | 10.9 | 7.9 | 4.4 |
| Internal volume of reactor, m.³ | 4.5 | 2.1 | 2.1 | 2.1 | 2.1 |
| Heat balance: | | | | | |
| Polymerization heat, kcal./hr. | 83,328 | 28,288 | 20,516 | 14,879 | 8,320 |
| Power heat, kcal./hr. | 2,707 | 1,590 | 5,021 | 17,169 | 18,100 |
| Sensible heat, kcal./hr. | −75,041 | | | | |
| Heat radiation,[1] kcal./hr. | −1,143 | −578 | −579 | −579 | −630 |
| Cooling rate, kcal./hr. from the heat transfer surface | −9,851 | −29,300 | −24,958 | −31,469 | −25,790 |
| Heat transfer capacity: | | | | | |
| Heat transfer area A, m.² | 13.1 | 26.5 | 26.5 | 26.5 | 13.5 |
| Total heat transfer coefficient U, kcal./m.² hr. °C. | 46.5 | 47.0 | 45.9 | 47.3 | 48.1 |
| A×U kcal./hr. °C. | 608 | 1,250 | 1,216 | 1,254 | 649.4 |
| Difference, Δt in °C., between the temp. of the polymerizing reaction liquid and the temp. of the coolant | 16.2 | 23.5 | 20.5 | 25.1 | 39.8 |
| Range, °C., of the temp distribution of the polymerizing reaction liquid | <1 | <1 | <1 | <1 | 4 |
| Agitator rotating velocity, r.p.m. | 140 | 45 | 45 | 44 | 18 |
| Viscosity in poise of the polymerizing reaction liquid [2] | 17 | 160 | 670 | 2,500 | 1,500 |
| Ratio of agitating vane delivery quantity or screw delivery quantity to quantity of treated polymerizing reaction liquid | 670 | 100 | 100 | 100 | 12 |

[1] Heat radiation from surfaces other than the cooling heat transfer surface.
[2] As measured at the outlet pipe of the reactor.

The superiority of the polymerizing process and apparatus according to the present invention are exemplified in the following.

A raw material liquid consisting of a mixture of a styrene monomer and toluene was delivered through metering pump 1 at feed rates of 1113.4 kg./hr. of the styrene monomer and 166.4 kg./hr. respectively, of toluene. The mixture was precooled to a temperature of 10° C. by a heat exchanger 2 and was then fed into the first stage reactor 5.

In the first stage reactor, the structure and rotating velocity of the agitating vanes were such that the delivery of the agitating vanes was about 670 times as large as the volumetric feeding rate of the mixture. Heat at the rate of 75,041 kcal./hr., quite close to the 83,328 kcal./hr. produced by the polymerization in the reactor, were obsorbed as sensible heat by the raw material mixture the moment after the raw material mixture entered the first stage reactor through the inlet 4.

Therefore, a reaction was conducted quickly at the chosen polymerization temperature of 138° C. for obtaining a polymerized product of the desired average molecular weight. In the first stage reactor, though a large amount of polymerization heat (83,328 kcal./hr.) was generated, the heat quantity required to be cooled by the cooling heat transfer surface was relatively small, 9851 kcal./hr., as compared with the reaction heat. Therefore, the necessary temperature difference between the polymerizing reaction temperature and the temperature of the cooling medium was only 16.2° C. As a result, the high viscosity stagnated layer in contact with the cooling surface became negligibly small.

Then, the first stage polymerizing reaction liquid in an amount equal to the amount of the raw material being fed into the first stage reactor was withdrawn and fed into the second stage reactor 11. The second stage polymerizing reaction liquid in an amount equal to the amount of the first stage polymerizing reaction liquid entering the second stage reactor, was withdrawn and fed to the third stage reactor 30.

Thus the polymerizing reaction liquid moved in equal amounts to each succeeding reactor, but, in each of the second stage reactor and third stage reactor, a polymerizing reaction took place at a reaction temperature substantially equal to that in the first stage reactor. An adequate screw delivery quantity (that is, the internally circulated volume) was obtained to provide substantially perfect mixing with comparatively small agitating power. Therefore, the temperature difference between the upper part and lower part of each of the first three reactors was less than 1° C.

Further, in the second third reactors, the average temperature difference between the polymerizing reaction temperature and the temperature of the cooling medium was respectively 23.5 and 20.5° C. and was comparatively small. As a result the stagnant layer of high viscosity in contact with the cooling heat transfer surface was slight.

In case (A), where the fourth stage reactor was of the same structure as the second and third stages, a gear pump was set near the outlet. The fourth stage polymerizing reaction liquid, in an amount equal to the amount of the raw material mixture fed to the first reactor, was discharged by this gear pump and the unreacted monomer present in it was separated from the produced polymer and was sent to a recovering step to be recovered. About 940 kg./hr. of general purpose polystyrene were produced. The total internal volume of all the respective reactors was 10.8 m.³. Thus, the productivity based on reactor volume was high.

In order to illustrate the superiority of the process and apparatus of the present invention, in case (A) the fourth stage reactor (IV) identical to second and third reactors 11 and 30 was used following the third stage reactor and in case (B) a scraping type reactor (V) of the same structure as described in FIGS. 1 and 2 of U.S. Pat. No. 3,206,287 was used as the fourth stage reactor.

In case (A) using the fourth stage reactor (IV) under the present invention, even though many cooling heat transfer pipes were arranged along the flow of the polymerizing reaction liquid in the annular flow path to present a comparatively large heat transfer area A of 26.5 m.², the screw agitating power per screw delivery quantity (that is, the screw agitating power per the internally circulated flow volume) was so small that a large screw delivery quantity (at a ratio of screw delivery quantity to polymerizing reaction treated quantity of about 100/1) was obtained with a suitably low screw agitating power. As a result, the contents in the fourth stage reactor were substantially perfectly mixed. The temperature difference between the upper part and lower part of the fourth reactor (IV) was less than 1° C. and the average temperature difference between the polymerization temperature of the polymerizing mixture and the temperature of the cooling medium was 25.1° C. The influence of the highly viscous stagnated layer in contact with the cooling heat transfer surface was small and the molecular weight distribution of the polymer product obtained by polymerization in the first stage reactor through the fourth stage reactor according to the present invention was narrow as shown by curve ① in FIG. 4. The physical properties as already described hereinabove were also excellent.

On the other hand, in case (B) where a scraping type reactor (V) as mentioned above was used as the fourth stage reactor, such a large agitating power was required to scrape off the high viscosity stagnant layer in contact with the cooling heat transfer surface that, even within a range of agitating power substantially the same as the agitating power in the above-mentioned fourth stage reactor (IV) under the present invention, the circulating flow volume in the reactor (V) could not be made very large; the ratio of the screw delivery quantity to the polymerizing reaction treated quantity was only about 12/1. The flow of the highly viscous polymerizing reaction liquid became localized, an unbalance of heat occurred and the temperature difference between the upper part and lower part of the polymerizing reactor was 4° C. Furthermore, in the fourth stage reactor (V), the cooling heat transfer area A was restricted in order to make it possible to rotate the scraping device and amounted to a comparatively small value. $A \times U$ also became small in value and, therefore, the temperature difference $\Delta t$ between the polymerization temperature and the temperature of the cooling medium had to be made as large as 39.8° C. Since the heat transfer resistance on the coolant side was substantially negligible, the temperature of the stagnant layer of polymerizing reaction liquid on the cooling surface became as low as about 98° C. and the viscosity of this layer at this temperature exceeded 3500 poises.

For the reasons that the above-mentioned internally circulated volume in reactor (V) could not be made adequately large and that the temperature of the cooling heat transfer surface was lowered to the extent that the viscosity of the stagnant layer of polymerizing reaction liquid greatly increased, even though the scraping was carried out, the high viscosity stagnated layer rotated along with the scraping vanes while remaining in contact with the cooling heat transfer surface, or at best a partly stagnated layer was produced. As a result, the reactor volume was substantially decreased and the rate of polymerization in this reactor was about 4.4% which was a very low value as compared with the polymerization rate of 7.9% in the fourth stage reactor IV of the present invention. Furthermore, the molecular weight distribution of the polymer obtained by using the above-mentioned scraping type reactor (V) as the fourth stage reactor (even following the first, second and third stage reactors (I) (II) and (III) of the present invention) was as shown in curve ② of FIG. 4 and was wider than the molecular weight distribution of the polymer produced by the process and apparatus of the present invention from the first stage to the fourth stage. If it is attempted to increase the agitation and heat transmission by elevating the rotating velocity of the scraper to the same degree as in the apparatus according to the present invention and since the scraping and agitating power required is substantially proportional to the first power of the rotating velocity and the heat transfer coefficient is proportional to the 0.5 to 0.515th power of the rotating velocity, the heat produced by the increased power input increases extremely and the heat quantity to be removed from the reactor is also increased. However, the heat transfer coefficient is not increased in proportion and such operation of the apparatus is not practical.

EXAMPLE 2

Tests were made on a first reactor having the structure shown in FIGS. 2 and 3 in one case and in another case on a second reactor of the same structure in which, however, the cooling pipes 17 were replaced by a rotating scraper and scraper arms attached to a common agitator shaft 2 as shown in FIGS. 1 and 2 of U.S. Pat. No. 3,206,287. Both reactors had an internal volume of 86 liters. Thus, the heat transfer area of the second reactor was reduced by the heat transfer area provided by the cooling pipes 17 which were removed to leave an annular space in which the scrapers and scraping arms could rotate. Each reactor was charged with 57.5 kg. of a styrene monomer and 10 kg. of toluene and the temperature was elevated to 110° C. while agitating at 30 r.p.m. of the agitator shaft $a$. Polymerization ensued while gradually elevating the temperature at the same agitating velocity. A batch-polymerization was thus carried out so that a temperature of about 180° C. might be reached in about 31 hours. Then the reaction was stopped and the polymerization product was taken out. When a temperature of almost 180° C. was reached in the above-mentioned scraping type reactor, the agitating power rose so high that it became impossible to maintain the rotational speed of 30 r.p.m. and therefore the speed had to be reduced to 17 r.p.m. The operational data just before the reaction was stopped at about 180° C. and the comparative data of the transparency of the respective polymerization products are presented in Table II below.

This data illustrates that a far superior product was obtained by the use of the reactor shown in FIGS. 2 and 3 of this invention than by the use of a scraping type reactor such as described in U.S. Pat. No. 3,206,287.

lower the Hazen number the more transparent is the sample.

A standard base solution was prepared by dissolving 1.246 g. of platinum potassium chloride (500 mg. as platinum) and 1,000 g. of cobalt chloride into 100 cc. of hydrochloric acid and diluting the solution to 1000 cc. with distilled water. Hazen number standard solutions were prepared by adding distilled water to the standard base solution in the amounts given in the following Table III.

TABLE III

| Hazen number | Standard solution, cc. | Distilled water, cc. | Hazen number | Standard solution, cc. | Distilled water, cc. |
| --- | --- | --- | --- | --- | --- |
| 0 | 0 | 100 | 100 | 20 | 80 |
| 10 | 2 | 98 | 120 | 24 | 76 |
| 20 | 4 | 96 | 140 | 28 | 72 |
| 30 | 6 | 94 | 160 | 32 | 68 |
| 40 | 8 | 92 | 180 | 36 | 64 |
| 50 | 10 | 90 | 200 | 40 | 60 |
| 60 | 12 | 88 | 250 | 50 | 50 |
| 70 | 14 | 86 | 300 | 60 | 40 |
| 80 | 16 | 84 | 400 | 80 | 20 |
| 90 | 18 | 82 | 500 | 100 | 0 |

The cobalt chloride used was 99% pure and the hydrochloric acid was a 35 wt. percent aqueous solution.

We claim:

1. Method of polymerizing a polymerizable monomer selected from the group consisting of styrene and a mixture of styrene with an olefinically unsaturated monomer copolymerizable therewith to form a highly viscous polymer, comprising (1) cooling said monomer to a predetermined temperature between 0° and 45° C.,
    (2) continuously feeding said monomer into a first mixing and reaction zone defined by first heat transfer surfaces,
    (3) polymerizing a portion of said monomer in said first zone and forming a mixture containing said monomer and polymer whereby substantially all of the heat of the polymerization reaction is absorbed by the sensible heat of the cooled monomer,
    (4) causing said mixture to flow in reverse directions and into contact with said first heat transfer surfaces, the ratio of the rate of the total flow in reverse di-

TABLE II

| | Reactor as shown in Figs. 2 and 3 | Scraping type reactor |
| --- | --- | --- |
| Cooling heat transfer area in m² | 2.75 | 1.97 |
| State just before the conclusion of the polymerization: | | |
| Screw delivery quantity, liters/sec | 0.32 | 0.15 |
| Temperature difference in ° C. between the upper and lower parts in the reactor | 0.2 | 15 |
| R.p.m. of shaft $a$ | 30 | 17 |
| Power to rotate shaft $a$, kw | 0.88 | 0.90 |
| Conversion, wt. percent | 93 | 65 |
| Transparency of the polymerization products: | | |
| 370 μ light absorption degree | 0.030 | 0.252 |
| Hazen number | 2.8 | 24.4 |

The Hazen number was determined by the following method:

Hazen number standard solutions prepared as explained below were placed in colorless, transparent test tubes and substantially the same amount of the polymerization product sample was placed in colorless, transparent test tube of the same quality and shape as of the test tubes containing the Hazen number standard solutions. Any foam produced was extracted and the sample was erected in parallel with the Hazen number standard solution in front of a white screen. The sample was compared by diffused day light and the Hazen number was determined from the Hazen number standard solution having the same tone and transparency as that of the sample. The rections to the rate of monomer feeding being from about 500:1 to 1000:1, (5) feeding said mixture at the equivalent rate of monomer feeding to one of a tubular heat exchange zone and an annular heat exchange zone, (6) continuously moving said mixture through said tubular heat exchange zone defined by a tubular heat exchange surface, the ratio of the rate of mixture moved through said tubular zone to the rate of feeding said mixture to one of said tubular and annular zones being at least about 35:1, (7) continuously moving said mixture through an annular heat exchange zone defined by inboard and outboard heat exchange surfaces, said annular zone being substantially coaxial with said tubular zone and having elongate heat exchange surfaces spaced between said inboard and outboard surfaces, (8) contacting said mixture with said heat exchange surfaces to exchange heat therewith, (9) recirculating said mixture from one of said tubular and annular zones to the other, and

(10) removing said mixture from one of said tubular and annular zones at the equivalent rate of monomer feeding.

2. Method as claimed in claim 1 wherein said monomer is styrene and said polymer is polystyrene and the viscosity of said mixture in step (5) is below about 40 poises.

3. Method as claimed in claim 1 wherein the mixture removed in step (10) is again subjected to steps (6) through (10).

References Cited
UNITED STATES PATENTS

| | | | |
|---|---|---|---|
| 3,206,287 | 9/1965 | Crawford | 260—93.5 |
| 3,243,481 | 3/1966 | Ruffing et al. | 260—880 |
| 3,513,145 | 5/1970 | Crawford | 260—93.5 |

JAMES A. SEIDLECK, Primary Examiner

U.S. Cl. X.R.

23—285; 260—85.5 HC, 86.7, 95 C